(12) United States Patent
Colin Armitage

(10) Patent No.: US 8,745,521 B2
(45) Date of Patent: Jun. 3, 2014

(54) SYSTEM AND METHOD FOR ANNOTATING GRAPHICAL USER INTERFACE

(75) Inventor: Christopher Colin Armitage, Tadley (GB)

(73) Assignee: The Original Software Group Limited (GB)

( * ) Notice: Subject to any disclaimer, the term of this patent is extended or adjusted under 35 U.S.C. 154(b) by 251 days.

(21) Appl. No.: 13/239,379

(22) Filed: Sep. 21, 2011

(65) Prior Publication Data

US 2013/0042200 A1 Feb. 14, 2013

Related U.S. Application Data

(60) Provisional application No. 61/521,327, filed on Aug. 8, 2011.

(51) Int. Cl.
*G06F 13/00* (2006.01)
*G06F 15/00* (2006.01)

(52) U.S. Cl.
USPC .......................................... 715/780; 715/788

(58) Field of Classification Search
USPC ................. 715/513, 780, 851–853, 751–753, 715/763–765
See application file for complete search history.

(56) References Cited

U.S. PATENT DOCUMENTS

| | | | | |
|---|---|---|---|---|
| 8,365,147 B2 * | 1/2013 | Grechanik et al. | ............ | 717/124 |
| 8,374,844 B2 * | 2/2013 | Brun et al. | ........................ | 704/9 |
| 2004/0261016 A1 * | 12/2004 | Glass et al. | ................... | 715/512 |
| 2005/0108630 A1 * | 5/2005 | Wasson et al. | ................ | 715/513 |
| 2011/0295853 A1 * | 12/2011 | Li et al. | ........................ | 707/736 |

* cited by examiner

*Primary Examiner* — Cao Kevin Nguyen
(74) *Attorney, Agent, or Firm* — James P. Muraff; Neal, Gerber & Eisenberg LLP

(57) ABSTRACT

A system and method of creating annotations for graphical user interface (GUI) objects is provided. The annotations may be based on best candidate GUI objects that are in the vicinity of GUI objects that need annotation. The best candidate GUI object may be selected based on the position of an unannotated GUI object, a position of candidate GUI objects, a role of the unannotated GUI object, and a precedence criteria of the unannotated GUI object. The precedence criteria may include a position preference for candidate GUI objects in relation to unannotated GUI objects. The annotations may also be based on information within a self-described GUI object. Options can be specified to define how the annotations are extracted from candidate GUI objects and self-described GUI objects. The annotation of GUI objects can assist non-technical users in the automated testing and documentation of GUIs.

32 Claims, 7 Drawing Sheets

SYSTEM AND METHOD FOR ANNOTATING GRAPHICAL USER INTERFACE

CROSS REFERENCE TO RELATED APPLICATION

This application is a non-provisional of U.S. Patent Application No. 61/521,327 filed on Aug. 8, 2011, which is incorporated herein by reference in its entirety.

TECHNICAL FIELD

This invention relates to a system and method for annotating graphical user interface objects. More particularly, the present invention provides a system and method of identifying graphical user interface objects by providing an annotation for the objects, based on the properties and positions of the surrounding objects in a graphical user interface.

BACKGROUND AND SUMMARY OF THE INVENTION

Before a software application can be deployed, it is typically tested to be sure it behaves as the developer intended. Where the application requires user input, such as through a graphical user interface (GUI), various input possibilities must be tested to ensure the application responds appropriately to the information provided. This also must be done if a GUI is changed, or added to the application by developers or by users that may need to tailor the application to suit their particular needs. One method of testing involves manual interaction with the GUI and/or supplying inputs to GUI objects to test their response. However, manual testing can be highly inefficient, especially where a large number of input possibilities are involved. Thus, in a field known as testing automation, software testers develop test scripts to automatically cycle through and provide numerous inputs in order to analyze the functionality of an application. Unfortunately, these test scripts can become as complex as the application source code they are testing and to reference GUI objects within the application requires knowledge of, and access to the source code underlying the application.

The challenge is communicating to the application what it is to do in a non-technical manner. Manually, a user can do this by interacting with the GUI objects, such as by entering data in a textbox or clicking on a command button. However, to automate this process so that it can cycle through a series of inputs without manual entry, test scripts have traditionally been required to identify the specific GUI object that is to be selected or that is to receive input by using the name given that GUI object within the application source code. For example, if a test script is to cycle through a series of numbers from 1 to 100 entered into a text box, the script must reference the text box with its name in the source code, which may be assigned according to a programming lexicon known only to the original programmer. If the source code is not available, as is typically the case, testing automation becomes complicated and requires a technically savvy tester.

The present invention is provided to create annotations for each unannotated GUI object based on the properties and positions of other GUI objects in a GUI. The GUI objects can include the unannotated GUI objects, candidate GUI objects, redundant GUI objects, and self-described GUI objects. The candidate GUI objects will contain text strings which can be used as the basis for creating annotations for the unannotated GUI objects. Nearby candidate GUI objects that are in the vicinity of an unannotated GUI object can be determined by the present invention, based on the locations and bounding rectangles of the unannotated GUI object and the candidate GUI objects, and the role and a precedence criteria of the unannotated GUI object. A best candidate GUI object can be selected from the nearby candidate GUI objects based on the precedence criteria. The text string included in the best candidate GUI object can then be used as the annotation for the unannotated GUI object.

By creating annotations for the unannotated GUI objects, the present invention can be used in conjunction with automated testing and documentation of a GUI, particularly by non-technical users. For instance, the present invention can help non-technical users test and document browser and legacy applications written in a variety of programming languages without reference to or needing access to the underlying source code, such as through the use of software including TestDrive from Original Software, for example. The present invention can simplify the commands used by non-technical users in creating a series of test automation steps in a test script, or in generating documentation of a GUI. Other features and advantages are provided by the following description and drawings.

DETAILED DESCRIPTION OF THE INVENTION

Figure 1:
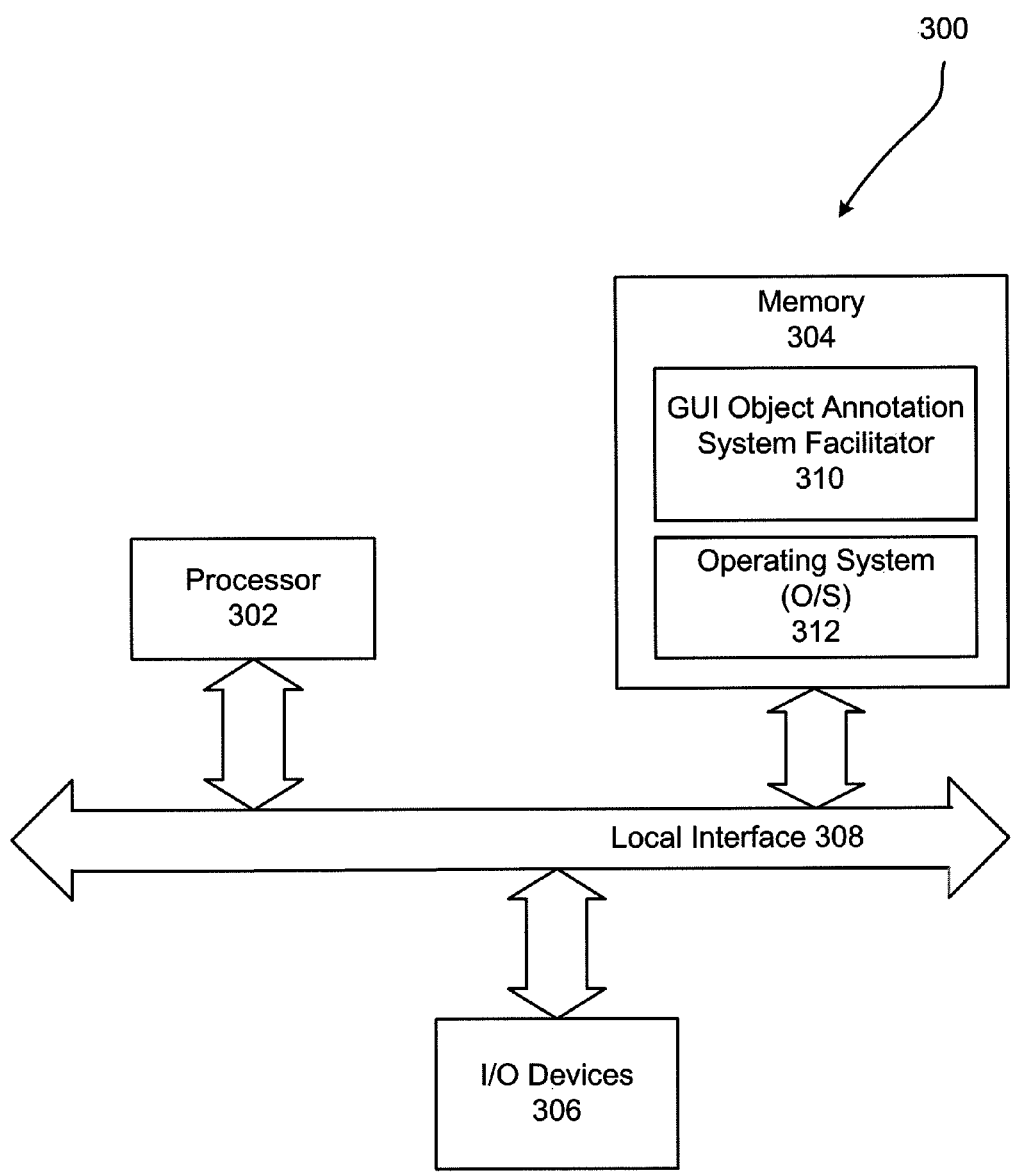
FIG. 1 is a block diagram of one form of a computing device, having a memory element with a computer readable medium for implementing a GUI object annotation system application.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
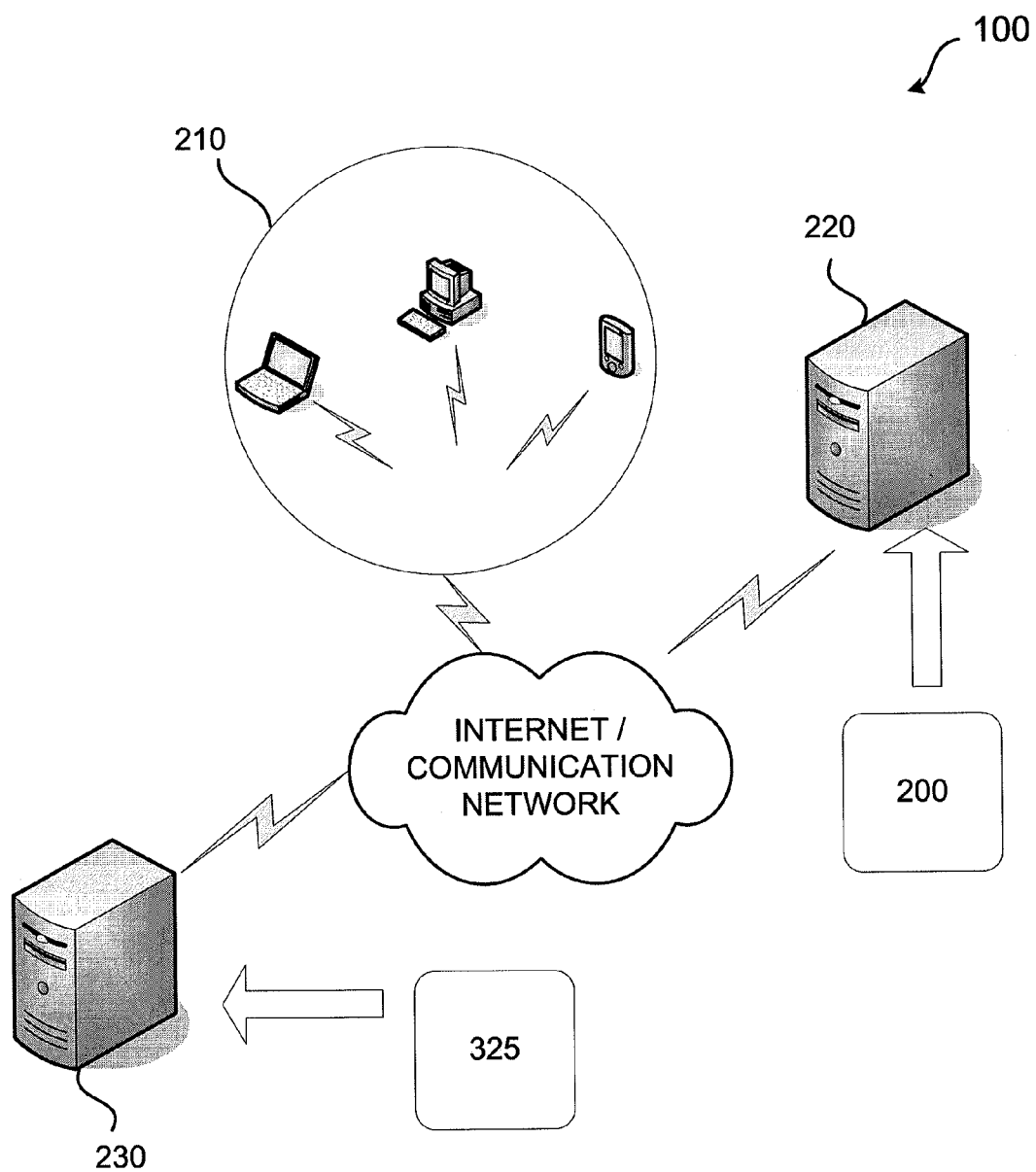
FIG. 2 is a graphical representation of hardware components and software applications that may be utilized or accessed by the GUI object annotation system according to a first configuration.

FIG. 1 is a block diagram of a computing device 300 housing executable software used to facilitate a GUI object annotation system 100 of FIG. 2. Computing device 300 may be any one of personal computing device 210, GUI object annotation system server 220, or GUI application server 230 that are shown in FIG. 2. Computing device 300 includes a memory element 304. Memory element 304 may include a computer readable medium for implementing the GUI object annotation system application 200, and for implementing particular system transactions. Computing device 300 also contains executable software, some of which may or may not be unique to the GUI object annotation system 100. Where a portion of the GUI object annotation system application 200 is stored on the computing device 300, it is represented by, and is a component of, GUI object annotation system facilitator 310. However, GUI object annotation system facilitator 310 may also comprise other software to enable full functionality of the GUI object annotation system 100 as described below, such as, for instance, a standard Internet browsing interface application.

In some embodiments, the GUI object annotation system facilitator 310 is implemented in software as an executable program, and is executed by one or more special or general purpose digital computer(s), such as a mainframe computer, a personal computer (desktop, laptop or otherwise), personal digital assistant, or other handheld computing device. Therefore, computing device 300 may be representative of any computer in which the GUI object annotation system facilitator 310 resides or partially resides, such as the GUI object annotation system server 220 of FIG. 2.

Generally, in terms of hardware architecture as shown in FIG. 1, computing device 300 includes a processor 302, a memory 304, and one or more input and/or output (I/O) devices 306 (or peripherals) that are communicatively coupled via a local interface 308. Local interface 308 may be one or more buses or other wired or wireless connections, as is known in the art. Local interface 308 may have additional elements, which are omitted for simplicity, such as controllers, buffers (caches), drivers, transmitters, and receivers to facilitate external communications with other like or dissimilar computing devices. Further, local interface 308 may include address, control, and/or data connections to enable internal communications among the other computer components.

Processor 302 is a hardware device for executing software, particularly software stored in memory 304. Processor 302 can be any custom made or commercially available processor, such as, for example, a Core series processor made by Intel Corporation, or a Phenom, Athlon or Sempron series processor made by Advanced Micro Devices, Inc. In the case where computing device 300 is a server, the processor may be, for example, a Xeon or Itanium series processor from Intel, or an Opteron series processor from Advanced Micro Devices, Inc. Processor 302 may also represent multiple parallel or distributed processors working in unison.

Memory 304 can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic, magnetic, optical, and/or other types of storage media. Memory 304 can have a distributed architecture where various components are situated remote from one another, but are still accessed by processor 302. These other components may reside on devices located elsewhere on a network or in a cloud arrangement.

The software in memory 304 may include one or more separate programs. The separate programs comprise ordered listings of executable instructions for implementing logical functions. In the example of FIG. 1, the software in memory 304 may include the GUI object annotation system facilitator 310 in accordance with the present invention, and a suitable operating system (O/S) 312. Examples of suitable commercially available operating systems 312 are Windows operating systems available from Microsoft Corporation, Mac OS X available from Apple Inc., a Unix operating system, or a Unix-derivative such as BSD or Linux. The operating system O/S 312 will depend on the type of computing device 300. For example, if the computing device 300 is a PDA or handheld computer, the operating system 312 may be iOS for operating certain devices from Apple Inc., PalmOS for devices from Palm Computing, Inc., Windows Phone 7 from Microsoft Corporation, Android from Google, Inc., Symbian from Nokia Corporation, or BlackBerry OS from Research in Motion Limited. Operating system 312 essentially controls the execution of other computer programs, such as the GUI object annotation system facilitator 310, and provides scheduling, input-output control, file and data management, memory management, and communication control and related services.

If computing device 300 is an IBM PC compatible computer, Wintel computer, or the like, the software in memory 304 may further include a basic input/output system (BIOS). The BIOS is a set of essential software routines that initialize and test hardware at startup, start operating system 312, and support the transfer of data among the hardware devices. The BIOS is stored in ROM so that the BIOS can be executed when computing device 300 is activated.

The GUI object annotation system facilitator 310 may be a source program, executable program (object code), script, or any other set of instructions to be performed. The GUI object annotation system facilitator 310 can be written in an object-oriented programming language or other type of programming language, such as, for example, Java, C, C++, C#, Visual Basic, Visual Basic .NET, Python, Ruby, or ColdFusion. Components of the system facilitator 310 may also be written in a proprietary language developed to interact with these known languages.

I/O device 306 may include input devices such as a keyboard, a mouse, a scanner, a microphone, a touch screen, a bar code reader, or an infra-red reader. It may also include output devices such as a printer, a video display, an audio speaker or headphone port or a projector. I/O device 306 may also comprise devices that communicate with inputs or outputs, such as a short-range transceiver (RFID, Bluetooth, etc.), a telephonic interface, a cellular communication port, a router, or other types of network communication equipment. I/O device 306 may be internal to computing device 300, or may be external and connected wirelessly or via connection cable, such as through a universal serial bus port.

When computing device 300 is in operation, processor 302 is configured to execute software stored within memory 304, to communicate data to and from memory 304, and to generally control operations of computing device 300 pursuant to the software. The GUI object annotation system facilitator 310 and operating system 312, in whole or in part, may be read by processor 302, buffered within processor 302, and then executed.

In the context of this document, a "computer-readable medium" may be any means that can store, communicate, propagate, or transport data objects for use by or in connection with the GUI object annotation system 100. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The GUI object annotation system facilitator 310 can be embodied in any type of computer-readable medium for use by or in connection with an instruction execution system or apparatus, such as a computer.

For purposes of connecting to other computing devices, computing device 300 is equipped with network communication equipment and circuitry. In a preferred embodiment, the network communication equipment includes a network card such as an Ethernet card, or a wireless connection card. In a preferred network environment, each of the plurality of computing devices 300 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the present invention is for each computing device 300 to have a broadband or wireless connection to the Internet (such as DSL, Cable, Wireless, T-1, T-3, OC3 or satellite, etc.), the principles of the present invention are also practicable with a dialup connection through a standard modem or other connection means. Wireless connections using infrared and radio frequency networks are also contemplated.

Figure 3:
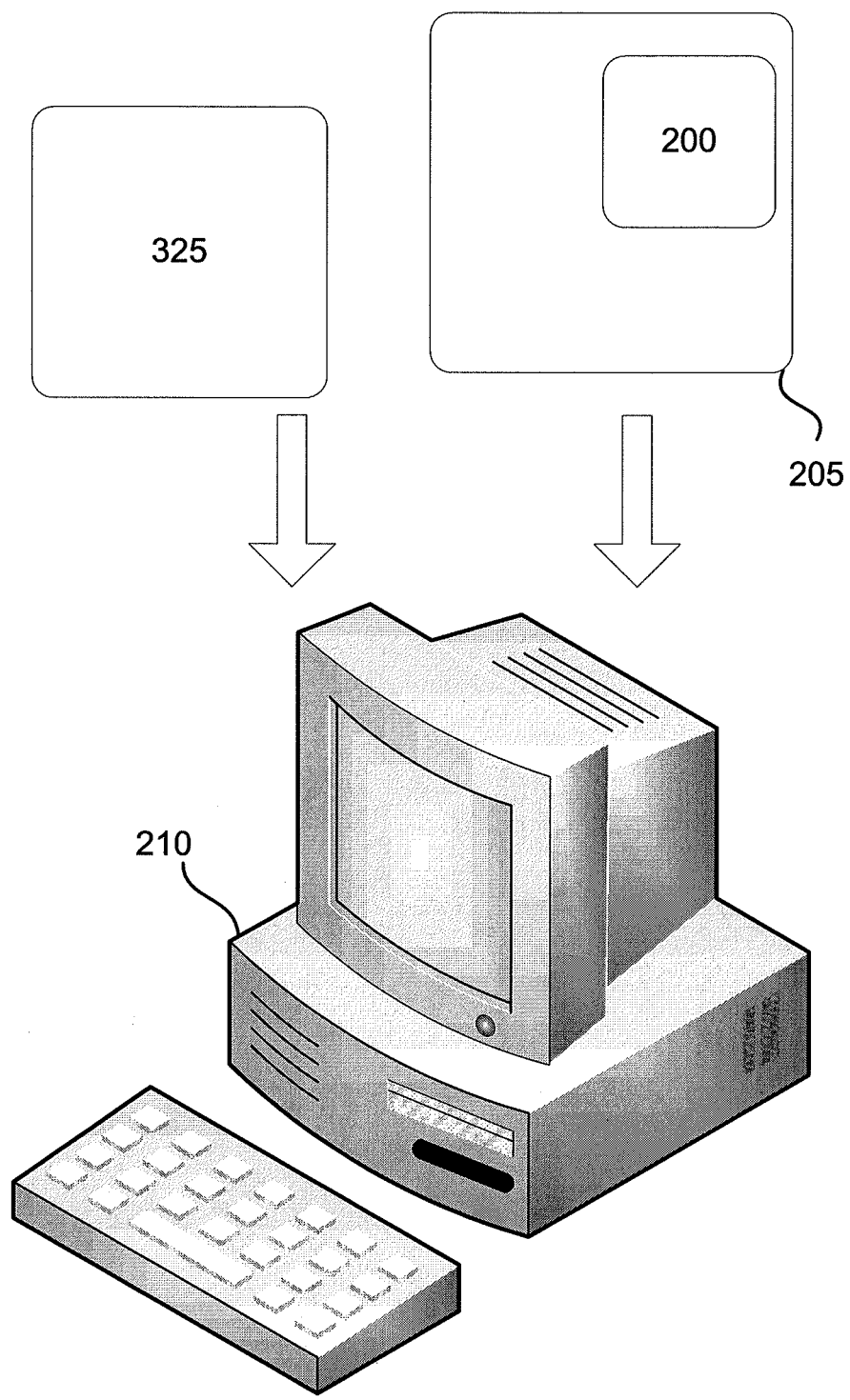
FIG. 3 is a graphical representation of hardware components and software applications that may be utilized or accessed by the GUI object annotation system according to a second configuration.

FIG. 2 is a graphical representation of a computer-based or implemented GUI object annotation system 100, wherein personal computing device 210 is connected to GUI object annotation system server 220 and GUI application server 230 through a networked connection, such as, for example, the Internet. In this example, GUI application server 230 houses the GUI application 325, GUI object annotation system server 220 houses the GUI object annotation system application 200, and personal computing device 210 may house nothing more than standard browser software for use as a viewing interface. In another embodiment, shown in FIG. 3, personal computing device 210 houses both the GUI application 325 and GUI object annotation system application 200, which is operated through its own interface 205. Accordingly, it will be understood that the procedure can take place through a network with different software components residing on a different hardware components, or it can take place with all of the software co-located. In addition, the GUI application can be a website or network-based application, or it can be a desktop application that provides GUIs to be tested.

Figure 4:
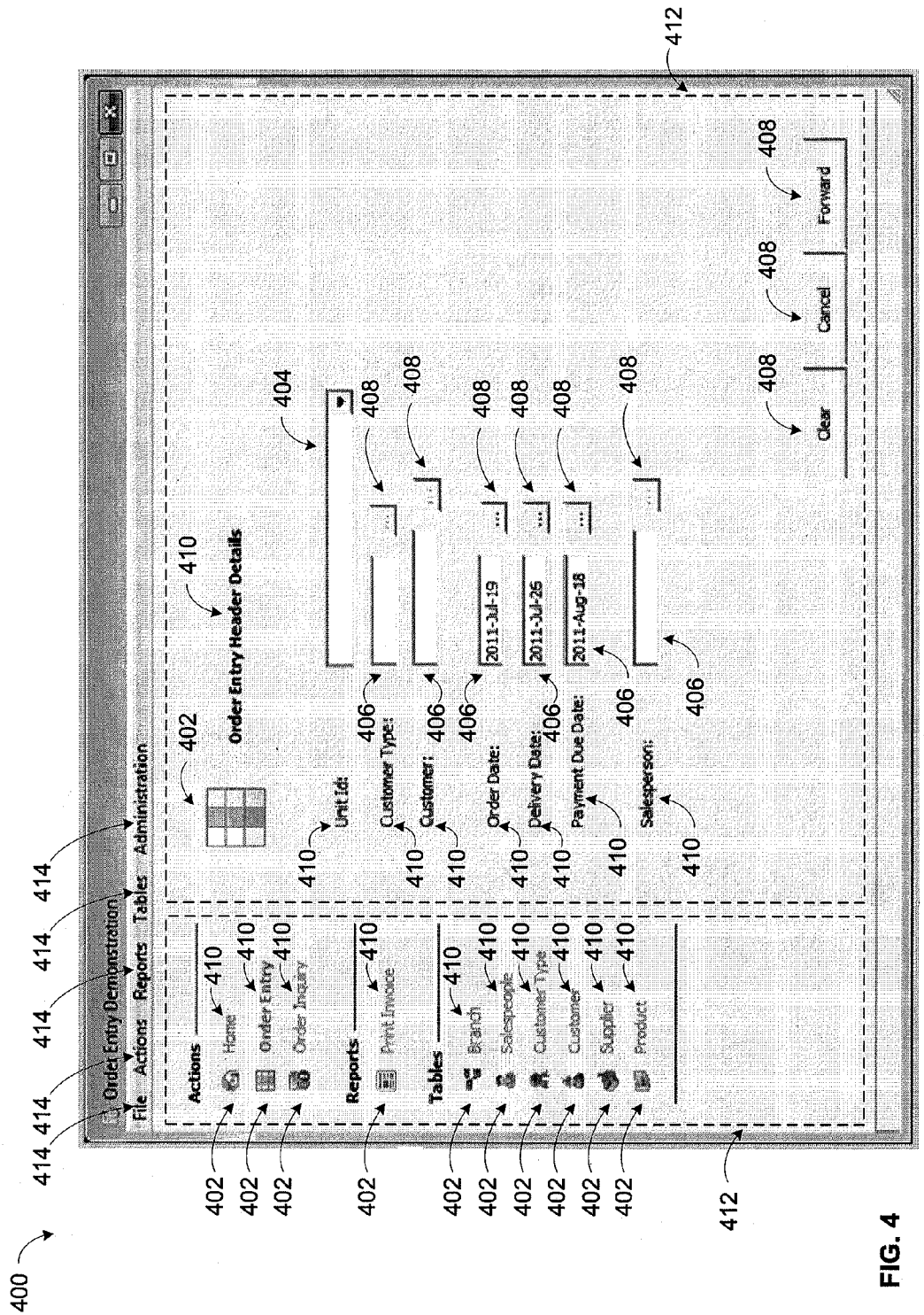
FIG. 4 is an exemplary GUI that can be processed by the GUI object annotation system.

FIG. 4 shows an exemplary GUI 400. Such GUIs may be presented through a software application housed on personal computing device 210, or presented through a network in the form of a webpage application generated by a remote computer such as GUI application server 230. Though the content of GUIs may vary, each GUI comprises a plurality of GUI objects arranged at different locations in the GUI. The GUI 400 may include one or more containers 412, where each container 412 includes one or more GUI objects within the container 412. A container 412 may be, for example, a form, a dialog box, a frame, a tab area, a grouping, or a set of GUI objects sharing the same parent. Some GUI objects may be designed to receive inputs and/or selections from a user, such as check boxes, combo boxes, drop down lists, list boxes, menus, menu items, push buttons, radio buttons, or up-down controls. Other GUI objects are used as identifiers or as controlling the layout of the GUI, such as static text, labels, constants, read-only edit windows, graphics; or panes. The exemplary GUI 400 shown in FIG. 4 includes GUI objects such as a graphic 402, a combo box 404, text boxes 406, push buttons 408, static text 410, and menus 414.

GUI objects may be categorized as including unannotated GUI objects, candidate GUI objects, redundant GUI objects, and self-described GUI objects. An unannotated GUI object can include a GUI object that may be uniquely identified by creating an annotation through use of the present invention. The annotation for an unannotated GUI object may be used, for example, by non-technical users to assist them in creating test scripts or documentation of a GUI. A candidate GUI object may include a GUI object that contains a text string, such as static text, labels, constants, and read-only edit windows. Candidate GUI objects can be used as the basis for creating an annotation for an unannotated GUI object. A maximum text length may be set when determining candidate GUI objects so that descriptive paragraphs are not considered a candidate GUI object. A redundant GUI object may include a GUI object that is used to control the layout of the GUI, such as a pane. Redundant GUI objects are typically not apparent to the user of the GUI and do not need an annotation. A self-described GUI object may include a GUI object that contains sufficient textual content to create an annotation without reference to candidate GUI objects. Self-described GUI objects may include, for example, a push button with a text caption, a radio button with a text caption, menus, and menu items.

Figure 5:
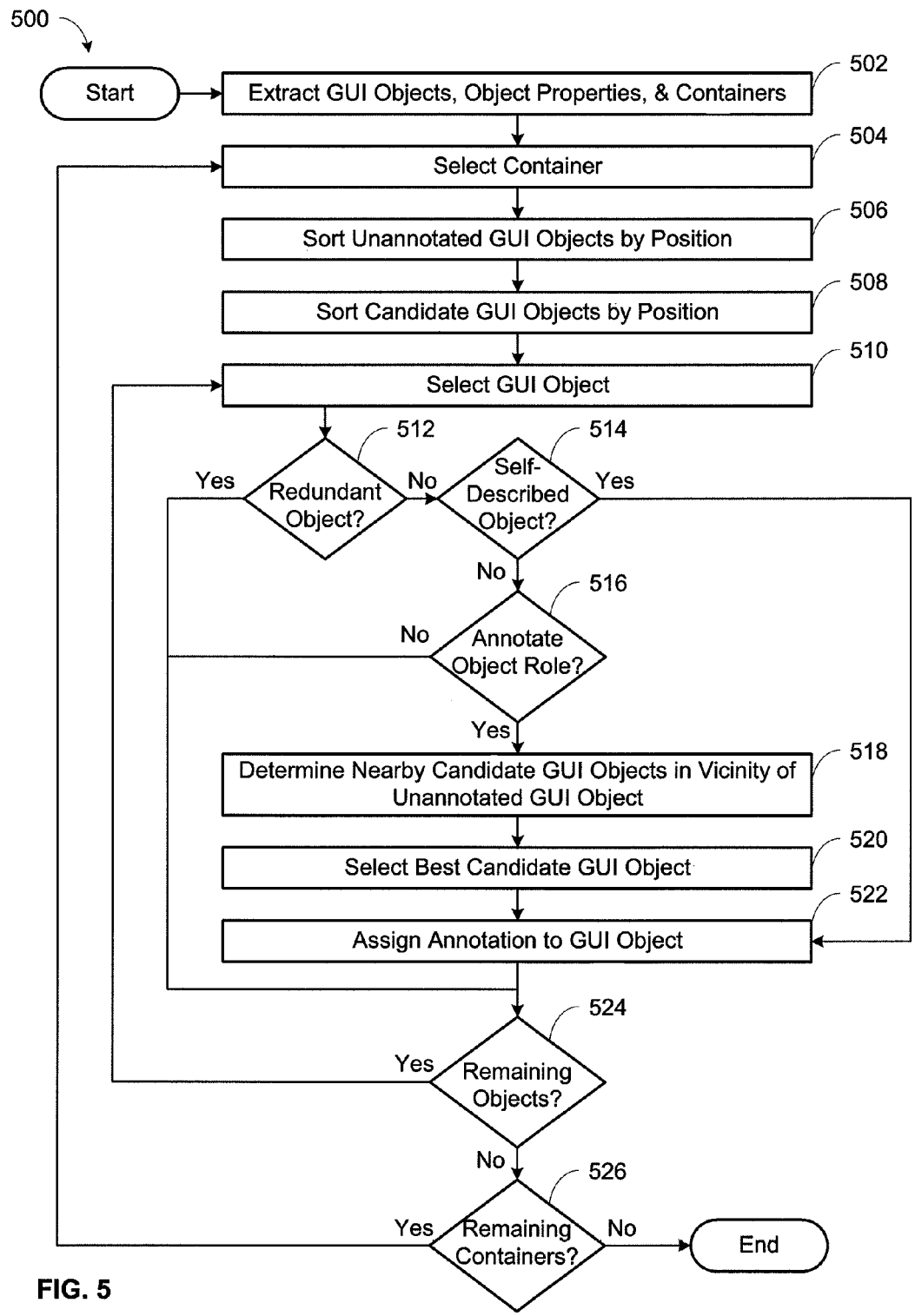
FIG. 5 is a flowchart illustrating operations for extracting GUI objects, determining candidate GUI objects, and creating annotations for GUI objects.

An embodiment of a process 500 is shown in FIG. 5 for creating annotations for GUI objects in a GUI. The GUI object annotation system application 200 can process a GUI of a GUI application 325 using the process 500 to result in the creation and assignment of unique annotations for unannotated GUI objects and self-described GUI objects. These GUI objects can subsequently be referred to in a test script or in documentation by the annotation assigned to the GUI object. For example, a text box GUI object with a nearby caption of "Age" could have the annotation "Age" assigned to it. The text box GUI object may then be referred to as "Age" and provided with a varying input in a test script. As another example, a push button with a caption of "Last Name" could have the annotation "Last Name" assigned to it. The push button may then be referred to as "Last Name" in documentation.

At step 502, each GUI object in the GUI, properties of the GUI objects, and containers of the GUI can be extracted. As described above, a GUI may contain one or more containers, each of which includes one or more GUI objects. The GUI objects may include unannotated GUI objects that need annotation, candidate GUI objects that can serve as the basis for annotations for unannotated GUI objects, redundant GUI objects that do not need annotation, and self-described GUI objects that have sufficient textual content allowing annotation without reference to candidate GUI objects. The extraction performed at step 502 may result in a hierarchical list of GUI objects, including the containers and GUI objects within each of the containers, and a role, a descriptor, a location, and a bounding rectangle for each of the GUI objects. Each of the containers and the GUI objects can exist in a parent/child relationship with one another. In particular, a container or a GUI object has a parent GUI object, except for the top-level container, and a GUI object may or may not have a child container or GUI object. The hierarchical list of GUI objects may assist in determining candidate GUI objects by limiting a search around a particular GUI object that needs to be annotated.

Each GUI object will have a role assigned to it during the extraction performed at step 502. The role of a GUI object describes the purpose and function of the GUI object in the GUI. Roles may be defined by an application programming interface (API), such as Microsoft Active Accessibility, or other APIs. A role may include, for example, an alert, an animation, an application, a border, a caret, a cell, a character, a chart, a check box, a client, a clock, a column, a column header, a combo box, a cursor, a diagram, a dial, a dialog box, a document, a drop list, an equation, a graphic, a grid expansion button, a grip, a grouping, a help balloon, a hotkey field, an indicator, an IP address box, a link, a list box, a list expansion button, a list item, a menu bar, a menu expansion button, a menu item, an outline, an outline control button, an outline item, a page tab, a page tab list, a pane, a popup menu, a progress bar, a property page, a push button, a radio button, a row, a row header, a scroll bar, a separator, a slider, a sound, a spin box, a split button, static text, a status bar, a table, text, a toolbar, a tooltip, a title bar, unknown, whitespace, and a window. Other roles may include roles exposed by other technologies, such as Java, and may include a date/time representation, a division, a document object model list item, a document object model table item, a document object model element, a PDF, and a document object model. The role extracted for an unannotated GUI object can be used later in the process 500 to determine whether a nearby candidate GUI object should serve as the basis for an annotation for the unannotated GUI object.

The descriptor of a GUI object can include a caption, description, or value of the GUI object, depending on the role of the GUI object. For example, a push button 408 in FIG. 4 may have the descriptor "Clear". As another example, static text 410 may have the descriptor "Branch". The location and bounding rectangle of a GUI object will describe the position of the GUI object in the GUI. An X-Y coordinate can specify the location of the GUI object's upper left corner relative to the upper left corner of the GUI or container. The GUI object can also be specified in relation to other GUI objects or other origins in the GUI or container. The bounding rectangle can specify the boundaries of the GUI object. The location and bounding rectangle can be specified in pixel units or other appropriate units. For example, a text box whose upper left corner is at 20 pixels right and 30 pixels down from the upper left corner of the GUI can have its location specified as (20, 30). If the text box has a size of 40 pixels wide by 15 pixels high, then its bounding rectangle can be specified as (40, 15).

The particular method of extraction performed at step 502 may vary depending on the operating environment that the GUI application 325 is executing on or the technology which the GUI application 325 is built. Methods of extraction can include Microsoft Active Accessibility, Microsoft UI Automation for .Net and Silverlight applications, IBM Enhanced High Level Language Application Program Interface (EHLLAPI) for IBM 3270 and IBM 5250 data streams, SAP Scripting Interface for SAP applications rendered without a browser, IAccessible2 for Mozilla Firefox browser, Java Accessibility Bridge for Java applications, and Microsoft Windows 32-bit Application Program Interface (API) for Microsoft Windows 32-bit applications.

As an example, extraction of GUI objects from a Microsoft Windows application at step 502 can use functions and constants of the Microsoft Windows 32-bit API. First, the EnumWindows function can be used to produce a list of top level windows and their handles from the desktop of the computer being analyzed. Next, the caption of each top level window can be retrieved using the GetWindowText function. The captions can be presented as a list so that a user can select which GUI application to perform extraction on. A list of child windows of the selected GUI application can be obtained using the EnumChildWindows function. For each child window, a class can be created to hold the child window and the properties of the window, including the class, location and size, visibility, and handle of the parent window, using the GetClassName, GetWindowPlacement, IsWindowVisible, and GetParent functions, respectively.

The GUI objects in each window can be retrieved by calling functions in the Microsoft Windows 32-bit API or by sending a Window Message to the window handle of the GUI object, depending on the class being analyzed. For example, if the class is WindowsForm*STATIC*, the GetWindowTextLength function can be called to determine the length of text available, followed by calling the GetWindowText function to retrieve the text string up to the length of the text found by the previous function. A role of static text can be assigned to the GUI object. As another example, if the class is WindowsForm*BUTTON*, the GetWindowTextLength function determines the length of text available, and the GetWindowText function retrieves the text string up to the length of the text found by the previous function. The GUI object in this example can be assigned a role of push button. As a further example, if the class is WindowsForm*EDIT* (single line), then the SendMessage function can be called with a Message ID of WM_GETTEXTLENGTH to determine the length of text available. The SendMessage function can then be called with a Message ID of WM_GETTEXT to retrieve the text string up to the length of the text found by the previous function. The GUI object in this example can be assigned the role of text.

Following extraction of the GUI objects, properties, and containers at step 502, the process 500 continues to step 504 to select a container for processing. If more than one container was extracted from the GUI at step 502, then each container will be processed in turn by the process 500. A class for the selected container may be created, such as by using a Dictionary data structure in the C# programming language, for example. At step 506, the unannotated GUI objects in the selected container may be sorted by their position in the GUI, or alternately, by their position in the selected container. The sorted list of unannotated GUI objects excludes redundant GUI objects and self-described GUI objects, both of which do not need annotations created for them. At step 508, the candidate GUI objects in the selected container may be sorted by their position in the GUI, or alternately, by their position in the selected container. The sorting of the unannotated GUI objects and candidate GUI objects at steps 506 and 508, respectively, may be in order of left to right, top to bottom, and/or other orderings. The sorted lists of steps 506 and 508 may be implemented in a SortedList data structure in the C# programming language, for example.

A GUI object in the selected container may be selected for processing at step 510. An unannotated GUI object from the sorted list of unannotated GUI objects, a redundant GUI object, or a self-described GUI object may be selected for processing at step 510. If more than one GUI object is within the selected container, then each GUI object will be processed in turn by the process 500. At step 512, it is determined whether the selected GUI object is a redundant GUI object that does not need an annotation. If the selected GUI object is a redundant GUI object, then the process 500 continues to step 524 to determine whether there are remaining GUI objects to process. If the selected GUI object is not a redundant GUI object at step 512, then the process 500 continues to step 514 to determine whether the selected GUI object is a self-described GUI object. If the selected GUI object is a self-described GUI object, then at step 522, an annotation can be created and assigned for the self-described GUI object based on the textual content present within the self-described GUI object itself. An embodiment of step 522 in the process 500 is discussed in more detail below in reference to FIG. 6.

If the selected GUI object is not a self-described GUI object at step 514, then the process 500 continues to step 516. At step 516, it is determined whether the role of the selected GUI object is permitted to be annotated, based on user or default options. At this point in the process 500, the selected GUI object can be presumed to be an unannotated GUI object because redundant and self-described GUI objects have already been processed at steps 512 and 514, respectively. A user can set which roles of GUI objects are permitted to be annotated by the process 500. Alternately, the user can set which roles of GUI objects are not permitted to be annotated by the process 500. If the unannotated GUI object is not permitted to be annotated, then the process 500 continues to step 524 to determine whether there are remaining GUI objects to process. However, if the unannotated GUI object is permitted to be annotated at step 516, then the process 500 continues to step 518.

At step 518, one or more nearby candidate GUI objects are determined that are in the vicinity of the unannotated GUI object being processed. The determination of the nearby candidate GUI objects can be based on the location and bounding rectangle of the unannotated GUI object, the location and bounding rectangle of the candidate GUI objects, and a precedence criteria of the unannotated GUI object. The precedence criteria can be set by the user to denote a ranking of position preferences of candidate GUI objects relative to the unannotated GUI object being processed. The position preference may be set for all unannotated GUI objects of a certain role and/or for individual unannotated GUI objects. The position preferences may include near left, left, left and above, left and below, above, below, near right, right, right and above, or right and below. For example, if the precedence criteria includes position preferences for left, above, and left and below, then candidate GUI objects that are in the vicinity of the unannotated GUI object and that are left, above, and left and below of the unannotated GUI object will be determined at step 518. In addition, the user can set a vertical and/or horizontal search range about the unannotated GUI object in order to limit the search for candidate GUI objects. Setting a search range may optimize the performance of the process 500 in the case when a large number of potential candidate GUI objects are present in a GUI. In one embodiment, if no search range is set, then all candidate GUI objects in the selected container will be considered.

The best candidate GUI object can be determined from the nearby candidate GUI objects at step 520, based on the precedence criteria of the unannotated GUI object being processed. The text string in the best candidate GUI object can be the basis for the annotation for the unannotated GUI object. The nearby candidate GUI object that matches the position preference may be selected as the best candidate GUI object at step 520. If there is more than one nearby candidate GUI object that matches the position preference, then the nearby candidate GUI object that is closest to the unannotated GUI object may be selected as the best candidate GUI object at step 520. At step 522, an annotation based on the best candidate GUI object is assigned to the unannotated GUI object. An embodiment of step 522 in the process 500 is discussed in more detail below in reference to FIG. 6.

Following annotation of the unannotated GUI object, the process 500 continues to step 524. At step 524, it can be determined whether there are remaining GUI objects to process in the selected container. Step 524 is also performed, as described above, after a redundant GUI object is processed or if the role of a particular GUI object is not set to be annotated. If GUI objects remain to be processed at step 524, then the process 500 returns to step 510 to select another GUI object to process. However, if no GUI objects remain to be processed at step 524, then at step 526, it is determined whether there are remaining containers to be processed. If there are remaining containers to be processed at step 526, then the process 500 returns to step 504 to select another container to process. However, if no containers remain to be processed at step 526, then the process 500 is complete.

Figure 6:
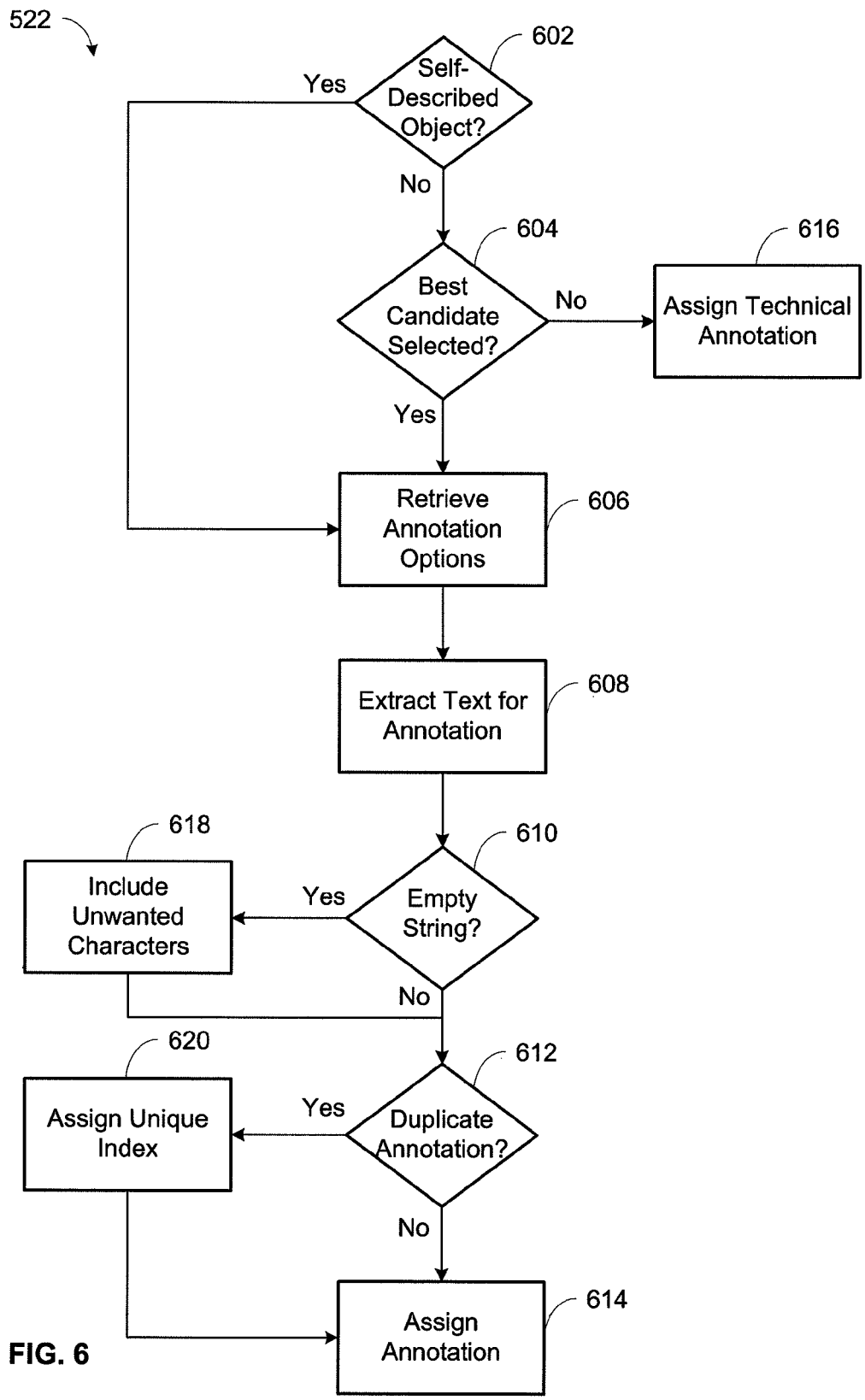
FIG. 6 is a flowchart illustrating operations for additional steps involved in creating annotations for GUI objects.

An embodiment of a process 522 for annotating GUI objects is shown in FIG. 6. The process 522 may be implemented when creating an annotation for a self-described GUI object or creating an annotation based on a candidate GUI object to an unannotated GUI object. At step 602, it is determined whether the GUI object having an annotation created is a self-described GUI object. If the GUI object is a self-described GUI object, the process 522 continues to step 606 to determine annotation options, which is described in further detail below. If the GUI object is not a self-described GUI object, it can be presumed that the GUI object having an annotation created is an unannotated GUI object and the process 522 continues to step 604.

At step 604, it is determined whether a best candidate GUI object was selected at step 520 for the unannotated GUI object. A best candidate GUI object may not have been selected if there were no candidate GUI objects that met the search range, role, and/or precedence criteria requirements, for example. If a best candidate GUI object was not selected, then at step 616, a technical annotation will be created for the unannotated GUI object instead of being based on a best candidate GUI object. The technical annotation may include information based on the role of the unannotated GUI object and a unique count for duplicate technical annotations within the role. In one embodiment, a technical annotation may be created for the unannotated GUI object even if an annotation has been created based on a best candidate GUI object. However, if a best candidate GUI object was selected at step 520, then the process 522 continues to step 606.

At step 606, annotation options can be retrieved that may be defaults or may have been set by a user. The annotation options can control how the annotation for the unannotated GUI object is created from the text string of the best candidate GUI object or from the text string attached to the self-described GUI object. Such options may include specifying a number of words to extract from the text string, specifying whether to extract leading words or trailing words of the text string, specifying whether to include or remove specific numbers, letters, and/or special characters from the text string, specifying a regular expression to match portions of the text string for the annotation, and other options.

After retrieving the annotation options, at step 608, text can be extracted from the text string in the best candidate GUI object or self-described GUI object for the annotation that is to be assigned to the unannotated GUI object. In the case of a self-described GUI object, the extraction of the text from the text string is from the textual content present in the self-described GUI object itself. The extraction of the text from the text string can be based on the annotation options that were retrieved at step 606. If one of the annotation options specifies removing specific characters from the text string, the extracted text at step 608 may result in a reduced text string or an empty string. At step 610, the extracted text is examined to determine whether it is an empty string. An empty string may occur, for example, if unwanted characters, such as specific numbers, letters, or special characters, were removed from the text string based on an annotation option and if those unwanted characters comprised the entire extracted text. If the extracted text is an empty string at step 610, then the unwanted characters are re-included in the extracted text at step 618 so that the annotation will not be an empty string.

Following inclusion of the unwanted characters at step 618 or if the extracted text is not an empty string at step 610, it is determined at step 612 whether the extracted text is a duplicate of an existing annotation for another GUI object. The existing annotation may be for a GUI object with the same or a different role as the unannotated GUI object being processed. If the extracted text is a duplicate of an existing annotation, then a unique index may be assigned to the unannotated GUI object being processed at step 620. The unique index may be an incremented number that is assigned for GUI objects that have the same annotation and that have the same role. After the unique index is assigned, the annotation is created and assigned at step 614. The annotation including the extracted text is also created and assigned at step 614, if the extracted text is not determined to be a duplicate annotation at step 612.

Figure 7:
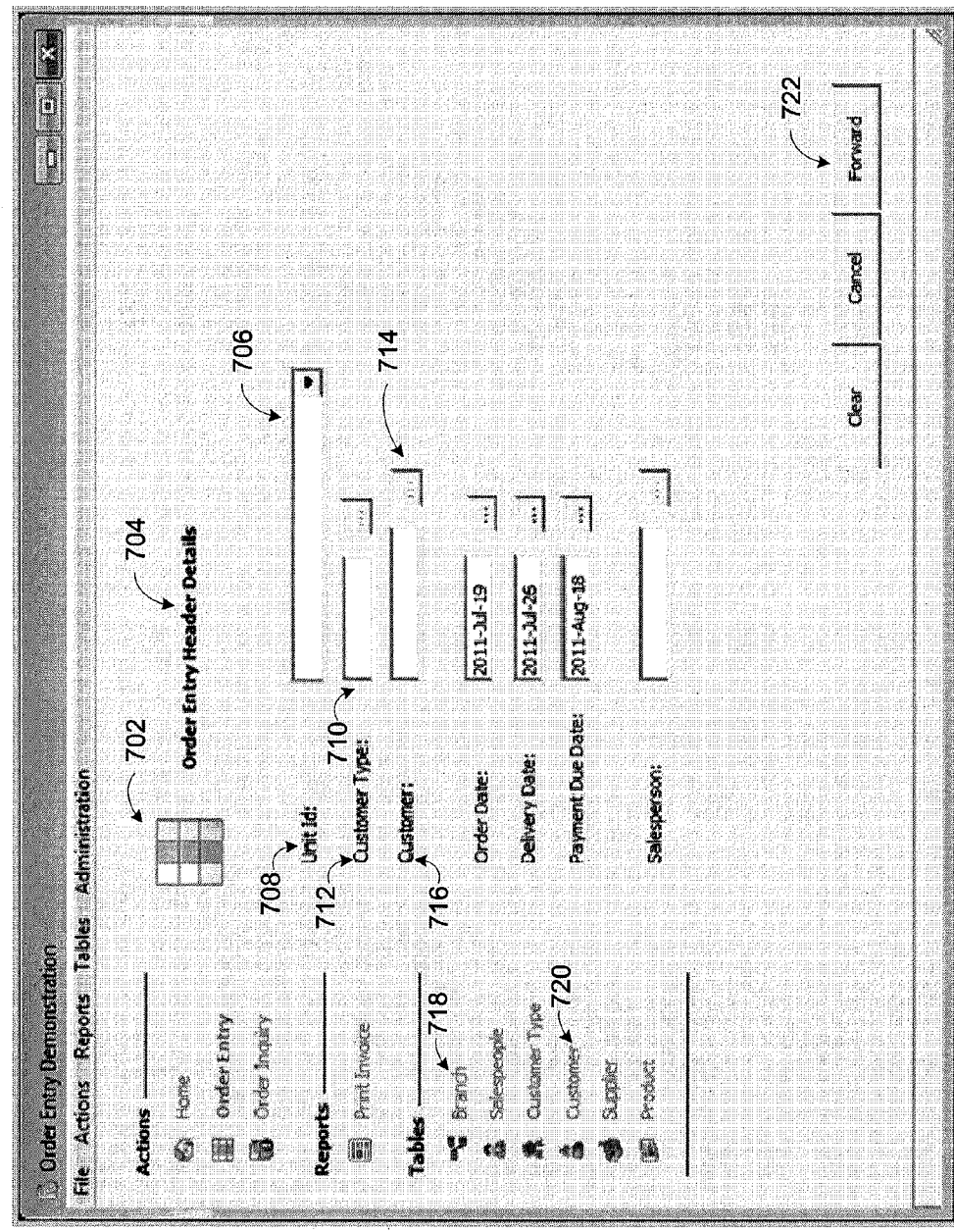
FIG. 7 is the exemplary GUI of FIG. 4 including the results of creating annotations for GUI objects.

An example of the results of the process 500 for creating annotations for GUI objects is detailed with reference to FIG. 7, which includes the exemplary GUI 400 shown in FIG. 4. In this example, options have been set to control the determination of nearby candidate GUI objects and the extraction of text from the text string of candidate GUI objects and self-described GUI objects for annotations. For the determination of nearby candidate GUI objects, the options that have been set include a vertical search range of 50 pixels; roles of GUI objects not to be annotated including client, table, row, and cell; and precedence criteria for graphic GUI objects and other GUI objects. The precedence criteria for the graphic GUI objects include position preferences of right, below, and below and right. The precedence criteria for other GUI objects include position preferences of left, above, above and left, right, and above and right. For the extraction of text from a text string, the options that have been set include that the number of words to include in the annotation is two, and that the words to include in the annotation are leading words of the text string. For purposes of clarity, the exemplary annotations described below are limited to a subset of the GUI objects in GUI 400.

The graphic 702 can have an annotation of "Order Entry". The "Order Entry" annotation can be created based on the candidate GUI object 704 with static text of "Order Entry Header Details". The first two words of the text can be used for the annotation because of the annotation options that two of the leading words should be extracted from the text string of the best candidate GUI object. Also, because the precedence criteria for a graphic GUI object includes a first position preference of right of the graphic GUI object, the candidate GUI object 704 is selected as the best candidate GUI object for the annotation of the graphic 702. Other candidate GUI objects in the vicinity of the graphic 702 that are left of the graphic 702, for example, would not have been selected as the nearby candidate GUI objects or as the best candidate GUI object.

The combo box 706 can have an annotation of "Unit Id". The "Unit Id" annotation can be created based on the candidate GUI object 708 with static text of "Unit Id". Due to the precedence criteria for non-graphic GUI objects including a first position preference of left of the GUI object, the candidate GUI object 708 is selected as the best candidate GUI object for the annotation of combo box 706. Similarly, the text box 710 can have an annotation of "Customer Type" due to the candidate GUI object 712 with static text of "Customer Type", and the push button 714 can have an annotation of "Customer" because of the candidate GUI object 716 with static text of "Customer".

The graphic 702, combo box 706, text box 710, and push button 714 can be considered unannotated GUI objects in the context of the process 500, and are annotated based on text strings of the best candidate GUI objects that are nearby. In contrast, the static text 718 and 720, and the push button 722 can be considered self-described GUI objects that have sufficient textual content within their properties to be annotated without needing to find and select a best candidate GUI object. In particular, the static text 718 can be annotated with "Branch" and the static text 720 can be annotated with "Customer" because they are self-described GUI objects. The static text 720 can also be assigned a unique index of 2 to differentiate the static text 720 from the push button 714 that also has an annotation of "Customer". The push button 722 can have an annotation of "Forward" because the text "Forward" is within the push button 722 itself.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method for creating an annotation for an unannotated graphical user interface (GUI) object in a GUI, the method comprising:
   extracting, from the GUI, a plurality of GUI objects and properties for each of the plurality of GUI objects, wherein:
      the properties for each of the plurality of GUI objects comprise a role describing a function of the GUI object in the GUI, a descriptor related to the role of the GUI object, a location of the GUI object within the GUI, and a bounding rectangle specifying the boundaries of the GUI object; and
      the plurality of GUI objects comprises the unannotated GUI object and a plurality of candidate GUI objects, wherein each of the plurality of candidate GUI objects has the descriptor comprising a text string;
   determining one or more nearby candidate GUI objects from the plurality of candidate GUI objects that are in the vicinity of the unannotated GUI object, based on the location and the bounding rectangle of the unannotated GUI object, the location and the bounding rectangle of each of the plurality of candidate GUI objects, the role of the unannotated GUI object, and a precedence criteria of the unannotated GUI object;
   selecting a best candidate GUI object from the one or more nearby candidate GUI objects, based on the precedence criteria of the unannotated GUI object; and assigning the text string of the best candidate GUI object as the annotation for the unannotated GUI object.

2. The method of claim 1, wherein the precedence criteria comprises a position preference of the one or more candidate GUI objects relative to the unannotated GUI object, wherein the position preference corresponds to the role of the unannotated GUI object.

3. The method of claim 2, wherein selecting the best candidate GUI object comprises selecting the best candidate GUI object from the one or more nearby candidate GUI objects that matches the position preference.

4. The method of claim 2, wherein selecting the best candidate GUI object comprises selecting the best candidate GUI object from the closest of the one or more nearby candidate GUI objects, if more than one of the one or more nearby candidate GUI objects matches the position preference.

5. The method of claim 2, wherein the position preference comprises one or more of near left, left, left and above, left and below, above, below, near right, right, right and above, or right and below.

6. The method of claim 1, wherein:
extracting further comprises extracting a container from the GUI, wherein the container comprises the plurality of GUI objects; and
determining the one or more nearby candidate GUI objects comprises determining the one or more nearby candidate GUI objects from the plurality of candidate GUI objects that are in the vicinity of the unannotated GUI object in the container.

7. The method of claim 6, wherein the container comprises a hierarchy of containers, the hierarchy of containers comprising a parent container and a child container subordinate to the parent container.

8. The method of claim 1, wherein the plurality of GUI objects further comprises a redundant GUI object for controlling a layout of the GUI.

9. The method of claim 1, wherein the plurality of GUI objects further comprises a self-described GUI object comprising textual content, the method further comprising assigning the textual content of the self-described GUI object as the annotation for the self-described GUI object.

10. The method of claim 1, wherein the role comprises one or more of an alert, an animation, an application, a border, a caret, a cell, a character, a chart, a check box, a client, a clock, a column, a column header, a combo box, a cursor, a diagram, a dial, a dialog box, a document, a drop list, an equation, a graphic, a grid expansion button, a grip, a grouping, a help balloon, a hotkey field, an indicator, an IP address box, a link, a list box, a list expansion button, a list item, a menu bar, a menu expansion button, a menu item, an outline, an outline control button, an outline item, a page tab, a page tab list, a pane, a popup menu, a progress bar, a property page, a push button, a radio button, a row, a row header, a scroll bar, a separator, a slider, a sound, a spin box, a split button, static text, a status bar, a table, text, a toolbar, a tooltip, a title bar, unknown, whitespace, and a window.

11. The method of claim 1, wherein determining the one or more nearby candidate GUI objects comprises determining the one or more nearby candidate GUI objects from the plurality of candidate GUI objects that are within a predetermined search range of the unannotated GUI object.

12. The method of claim 1, wherein determining the one or more nearby candidate GUI objects comprises determining the one or more nearby candidate GUI objects from the plurality of candidate GUI objects that are in the vicinity of the unannotated GUI object, if the role of the unannotated GUI object is permitted to be annotated.

13. The method of claim 1, wherein assigning the text string comprises assigning one or more of a predetermined number of words of the text string, leading words of the text string, or trailing words of the text string as the annotation for the unannotated GUI object.

14. The method of claim 1, wherein assigning the text string comprises:
removing one or more characters from the text string of the best candidate GUI object to produce a reduced text string;
assigning the reduced text string as the annotation for the unannotated GUI object, if the reduced text string is not empty; and
assigning the text string of the best candidate GUI object as the annotation for the unannotated GUI object, if the reduced text string is empty.

15. The method of claim 1, further comprising assigning an unique index to the unannotated GUI object, if the annotation is the same as a second annotation for a second unannotated GUI object having the role of the unannotated GUI object.

16. The method of claim 1, wherein the unannotated GUI object comprises a plurality of unannotated GUI objects, wherein:
the method further comprises:
creating an unannotated GUI object list comprising the plurality of unannotated GUI objects sorted by the location of each of the plurality of unannotated GUI objects; and
creating a candidate GUI object list comprising the plurality of candidate GUI objects sorted by the location of each of the plurality of candidate GUI objects; and
determining the one or more nearby candidate GUI objects comprises determining the one or more nearby candidate GUI objects from the plurality of candidate GUI objects that are in the vicinity of the unannotated GUI object, in sequence of the plurality of unannotated GUI objects in the unannotated GUI object list.

17. A computer for creating an annotation for an unannotated graphic user interface (GUI) object in a GUI application, the computer comprising a processor and a memory comprising the GUI application and a GUI object annotation application, the processor in communication with a user interface, the GUI object annotation application configured to:
receive a plurality of GUI objects and properties for each of the plurality of GUI objects that have been extracted from a GUI of the GUI application, wherein:
the properties for each of the plurality of GUI objects comprise a role describing a function of the GUI object in the GUI, a descriptor related to the role of the GUI object, a location of the GUI object within the GUI, and a bounding rectangle specifying the boundaries of the GUI object; and
the plurality of GUI objects comprises the unannotated GUI object and a plurality of candidate GUI objects, wherein each of the plurality of candidate GUI objects has the descriptor comprising a text string;
determine one or more nearby candidate GUI objects from the plurality of candidate GUI objects that are in the vicinity of the unannotated GUI object, based on the location and the bounding rectangle of the unannotated GUI object, the location and the bounding rectangle of each of the plurality of candidate GUI objects, the role of the unannotated GUI object, and a precedence criteria of the unannotated GUI object;

select a best candidate GUI object from the one or more nearby candidate GUI objects, based on the precedence criteria of the unannotated GUI object; and assign the text string of the best candidate GUI object as the annotation for the unannotated GUI object.

18. The computer of claim 17, wherein the precedence criteria comprises a position preference of the one or more candidate GUI objects relative to the unannotated GUI object, wherein the position preference corresponds to the role of the unannotated GUI object.

19. The computer of claim 18, wherein the GUI object annotation application is configured to select the best candidate GUI object by selecting the best candidate GUI object from the one or more nearby candidate GUI objects that matches the position preference.

20. The computer of claim 18, wherein the GUI object annotation application is configured to select the best candidate GUI object by selecting the best candidate GUI object from the closest of the one or more nearby candidate GUI objects, if more than one of the one or more nearby candidate GUI objects matches the position preference.

21. The computer of claim 18, wherein the position preference comprises one or more of near left, left, left and above, left and below, above, below, near right, right, right and above, or right and below.

22. The computer of claim 17, wherein the GUI object annotation application is configured to:
extract by extracting a container from the GUI, wherein the container comprises the plurality of GUI objects; and
determine the one or more nearby candidate GUI objects by determining the one or more nearby candidate GUI objects from the plurality of candidate GUI objects that are in the vicinity of the unannotated GUI object in the container.

23. The computer of claim 22, wherein the container comprises a hierarchy of containers, the hierarchy of containers comprising a parent container and a child container subordinate to the parent container.

24. The computer of claim 17, wherein the plurality of GUI objects further comprises a redundant GUI object for controlling a layout of the GUI.

25. The computer of claim 17, wherein:
the plurality of GUI objects further comprises a self-described GUI object comprising textual content; and
the GUI object annotation application is further configured to assign the textual content of the self-described GUI object as the annotation for the self-described GUI object.

26. The computer of claim 17, wherein the role comprises one or more of an alert, an animation, an application, a border, a caret, a cell, a character, a chart, a check box, a client, a clock, a column, a column header, a combo box, a cursor, a diagram, a dial, a dialog box, a document, a drop list, an equation, a graphic, a grid expansion button, a grip, a grouping, a help balloon, a hotkey field, an indicator, an IP address box, a link, a list box, a list expansion button, a list item, a menu bar, a menu expansion button, a menu item, an outline, an outline control button, an outline item, a page tab, a page tab list, a pane, a popup menu, a progress bar, a property page, a push button, a radio button, a row, a row header, a scroll bar, a separator, a slider, a sound, a spin box, a split button, static text, a status bar, a table, text, a toolbar, a tooltip, a title bar, unknown, whitespace, and a window.

27. The computer of claim 17, wherein the GUI object annotation application is configured to determine the one or more nearby candidate GUI objects by determining the one or more nearby candidate GUI objects from the plurality of candidate GUI objects that are within a predetermined search range of the unannotated GUI object.

28. The computer of claim 17, wherein the GUI object annotation application is configured to determine the one or more nearby candidate GUI objects by determining the one or more nearby candidate GUI objects from the plurality of candidate GUI objects that are in the vicinity of the unannotated GUI object, if the role of the unannotated GUI object is permitted to be annotated.

29. The computer of claim 17, wherein the GUI object annotation application is configured to assign the text string by assigning one or more of a predetermined number of words of the text string, leading words of the text string, or trailing words of the text string as the annotation for the unannotated GUI object.

30. The computer of claim 17, wherein the GUI object annotation application is configured to assign the text string by:
removing one or more characters from the text string of the best candidate GUI object to produce a reduced text string;
assigning the reduced text string as the annotation for the unannotated GUI object, if the reduced text string is not empty; and
assigning the text string of the best candidate GUI object as the annotation for the unannotated GUI object, if the reduced text string is empty.

31. The computer of claim 17, wherein the GUI object annotation application is further configured to assign an unique index to the unannotated GUI object, if the annotation is the same as a second annotation for a second unannotated GUI object having the role of the unannotated GUI object.

32. The computer of claim 17, wherein the unannotated GUI object comprises a plurality of unannotated GUI objects, wherein:
the GUI object annotation application is further configured to:
create an unannotated GUI object list comprising the plurality of unannotated GUI objects sorted by the location of each of the plurality of unannotated GUI objects; and
create a candidate GUI object list comprising the plurality of candidate GUI objects sorted by the location of each of the plurality of candidate GUI objects; and
the GUI object annotation application is configured to determine the one or more nearby candidate GUI objects by determining the one or more nearby candidate GUI objects from the plurality of candidate GUI objects that are in the vicinity of the unannotated GUI object, in sequence of the plurality of unannotated GUI objects in the unannotated GUI object list.

* * * * *